United States Patent
Sharma et al.

(10) Patent No.: US 7,730,712 B2
(45) Date of Patent: Jun. 8, 2010

(54) SYSTEM AND METHOD FOR USE IN A COMBINED CYCLE OR RANKINE CYCLE POWER PLANT USING AN AIR-COOLED STEAM CONDENSER

(75) Inventors: Anil Kumar Sharma, Rewa (IN); Prakash Narayan, Chennai (IN); Shinoj Vakkayil Chandrabose, Thrissur (IN)

(73) Assignee: General Electric Company, Schenectady, NY (US)

( * ) Notice: Subject to any disclaimer, the term of this patent is extended or adjusted under 35 U.S.C. 154(b) by 91 days.

(21) Appl. No.: 12/183,350

(22) Filed: Jul. 31, 2008

(65) Prior Publication Data

US 2010/0024380 A1 Feb. 4, 2010

(51) Int. Cl.
*F02C 6/00* (2006.01)
(52) U.S. Cl. .................. 60/39.181; 60/39.3; 60/685; 62/115
(58) Field of Classification Search ........... 60/39.181, 60/39.3, 775, 793, 685, 693; 62/115, 238.3
See application file for complete search history.

(56) References Cited

U.S. PATENT DOCUMENTS

| | | | | |
|---|---|---|---|---|
| 3,423,078 A | * | 1/1969 | May | 261/138 |
| 3,831,667 A | * | 8/1974 | Kilgore et al. | 165/96 |
| 4,223,529 A | | 9/1980 | Willyoung | |
| 4,353,217 A | | 10/1982 | Nishioka et al. | |
| 4,379,485 A | * | 4/1983 | Fisher et al. | 165/110 |
| 4,520,634 A | | 6/1985 | Oouchi et al. | |
| 4,655,975 A | | 4/1987 | Snoble | |
| 5,555,738 A | | 9/1996 | DeVault | |
| 5,675,970 A | | 10/1997 | Yamada et al. | |
| 5,787,970 A | * | 8/1998 | Larinoff | 165/111 |
| 6,058,695 A | | 5/2000 | Ranasinghe et al. | |
| 6,170,263 B1 | | 1/2001 | Chow et al. | |
| 7,178,348 B2 | | 2/2007 | Stuhlmueller | |
| 2006/0123767 A1 | * | 6/2006 | Briesch | 60/39.182 |
| 2007/0006565 A1 | | 1/2007 | Fleischer et al. | |

* cited by examiner

*Primary Examiner*—Michael Cuff
*Assistant Examiner*—Phutthiwat Wongwian
(74) *Attorney, Agent, or Firm*—Cantor Colburn LLP

(57) ABSTRACT

A system for use in a combined cycle or rankine cycle power plant using an air-cooled steam condenser is provided and includes a steam turbine from which first and second steam supplies are outputted at high and low respective pressures, an air-cooled condenser configured to fluidly receive and to air-cool at least the first steam supply via a supply of air, a cooling tower from which a first water supply is cycled, a chilling coil through which a second water supply water is cycled to thereby cool the supply of air, and a vapor-absorption-machine (VAM) configured to fluidly receive the second steam supply and the first water supply by which a refrigeration cycle is conducted to thereby cool the second water supply.

14 Claims, 2 Drawing Sheets

Figure 1:
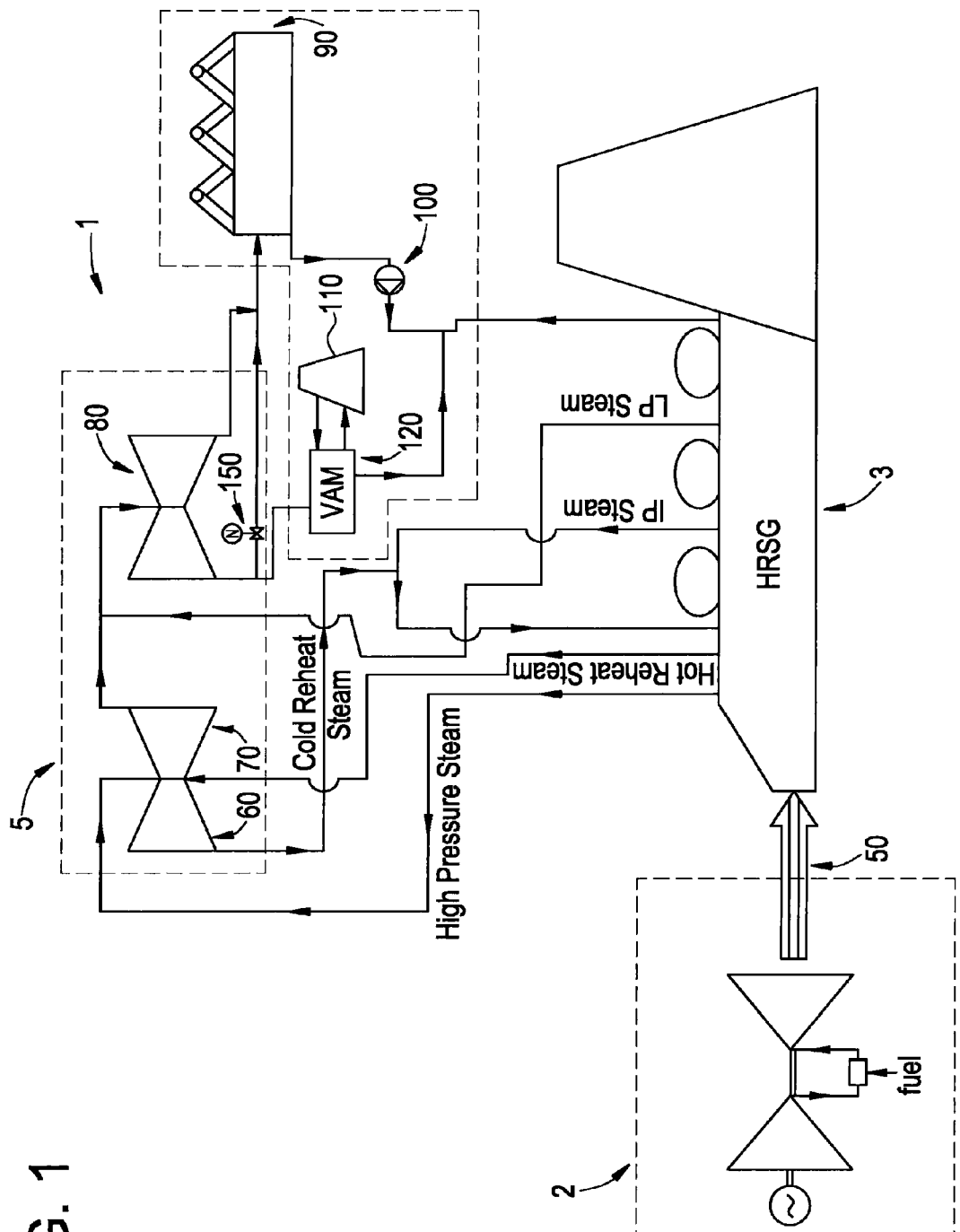

SYSTEM AND METHOD FOR USE IN A COMBINED CYCLE OR RANKINE CYCLE POWER PLANT USING AN AIR-COOLED STEAM CONDENSER

BACKGROUND OF THE INVENTION

1. Field of the Invention

Aspects of the present invention are directed to a system and a method for use in a combined cycle or rankine cycle power plant and, more particularly, to a system and a method for use in a combined cycle or rankine cycle power plant with an air-cooled steam condenser to improve an efficiency thereof.

2. Description of the Background

For combined cycle power plants to be used in water scare regions of the world an air cooled condenser is installed due to unavailability of water. The air-cooled condenser having cooling limitation and imparts a penalty on the performance of the power plant.

This problem has been addressed in some cases, by using an auxiliary air cooled condenser on particularly hot days. In still other cases, air cooled condensers are installed in combined cycle power plants including an auxiliary fin fan cooler which will be operated during hot days to reduce extra load for the air cooled condenser.

SUMMARY OF THE INVENTION

In accordance with an aspect of the invention, a system for use in a combined cycle or rankine cycle power plant is provided and includes a steam turbine from which first and second steam supplies are outputted, an air-cooled condenser configured to fluidly receive and to air-cool at least the first steam supply via a supply of air, a cooling tower from which a first water supply is cycled, a chilling coil through which a second water supply water is cycled to thereby cool the supply of air, and a vapor-absorption-machine (VAM) configured to fluidly receive the second steam supply and the first water supply by which a refrigeration cycle is conducted to thereby cool the second water supply.

In accordance with another aspect of the invention, a system for use in a combined cycle or rankine cycle power plant is provided in which the power plant includes a steam source which generates steam during operations thereof, and at least high and low pressure steam turbines, each of which is configured to fluidly receive the generated steam, the low pressure steam turbine being further configured to output first and second steam supplies, and the system includes an air-cooled condenser configured to fluidly receive and to air-cool at least the first steam supply via a supply of air, a cooling tower from which a first water supply is cycled, a chilling coil through which a second water supply water is cycled to thereby cool the supply of air to the air-cooled condenser, and a vapor-absorption-machine (VAM) configured to fluidly receive the second steam supply and the first water supply by which a refrigeration cycle is conducted to thereby cool the second water supply.

In accordance with another aspect of the invention, a method for use in a combined cycle or rankine cycle power plant, including a cooling tower from which a first water supply is cycled and, at least, high and low pressure steam turbines, the low pressure steam turbine being configured to output first and second steam supplies is provided and includes cooling a supply of air via a second water supply 140, operating an air-cooled condenser 90 via the supply of air to thereby condense at least the first steam supply, and cooling the second water 140 supply via a refrigeration cycle in which the second steam supply activates a refrigerant and the first water supply cycled from the cooling tower 110 cools and condenses the refrigerant which subsequently exchanges heat with the second water supply 140.

BRIEF DESCRIPTIONS OF THE DRAWINGS

Figure 2:
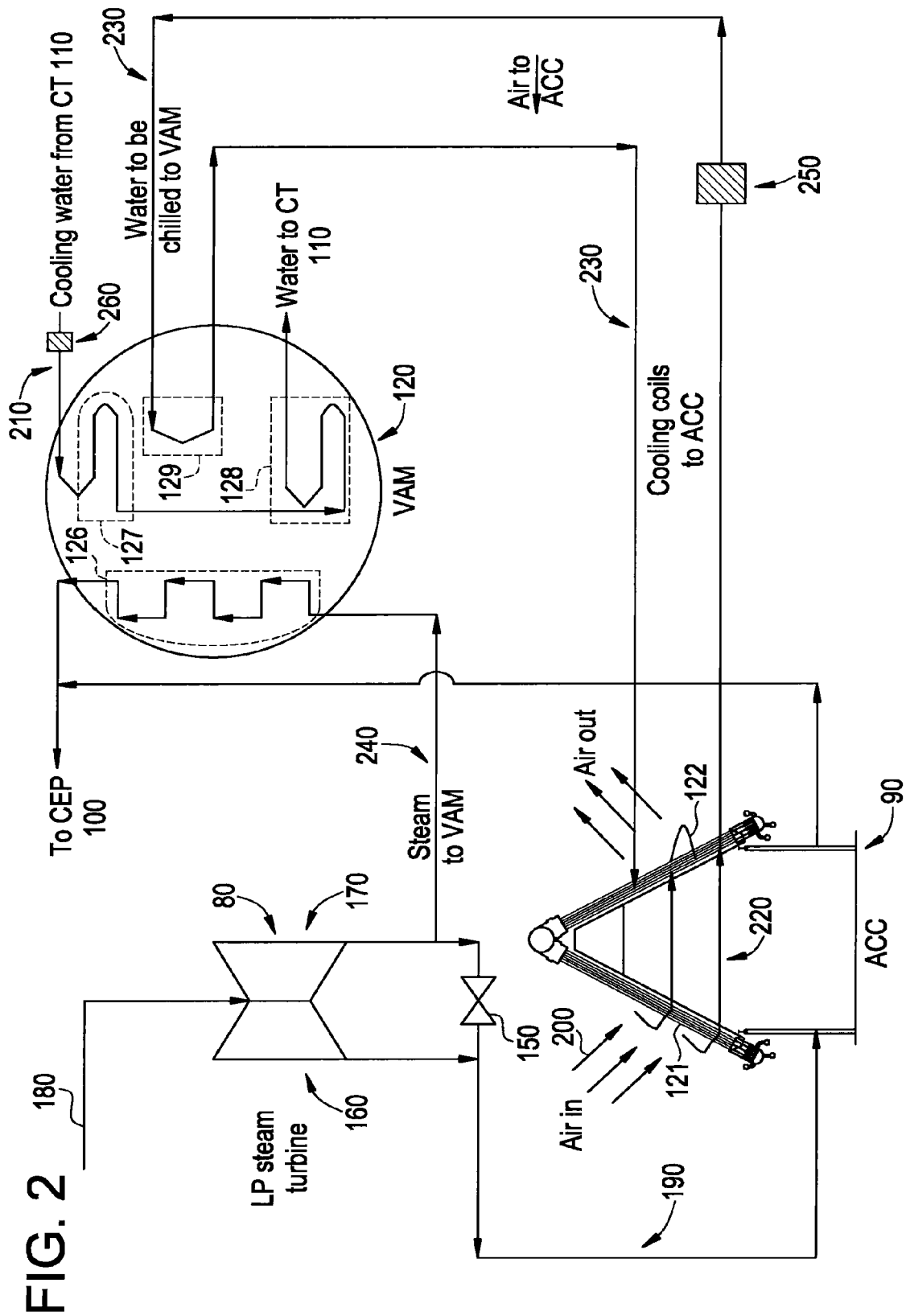

The subject matter regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

FIG. 1 is schematic illustration of an exemplary combined cycle power plant; and FIG. 2 is a schematic illustration of a portion of the combined cycle power plant of FIG. 1.

DETAILED DESCRIPTION OF THE INVENTION

With reference to FIGS. 1 and 2, a system 1 for use in a power plant, such as a combined cycle power plant or a rankine cycle power plant, is provided. The power plant includes a steam source, such as a gas turbine 2, which generates heat 50 during operations thereof, a heat recovery steam generator (HRSG) 3, which is coupled to the gas turbine 2, a cooling tower 110, and steam turbines 5, such as a high pressure steam turbine (HPST) 60, an intermediate pressure steam turbine (IPST) 70 and a low pressure steam turbine (LPST) 80. The HRSG 3 generates steam by way of the heat generated by the gas turbine 2 and includes heat exchangers, such as super heaters, evaporators, and pre-heaters, which are disposed along an axis thereof, and by which portions of the generated steam are diverted to the HPST 60, the IPST 70 and the LPST 80. The HPST 60, the IPST 70 and the LPST 80 generate power, such as electricity, by way of the diverted steam, and output spent steam supplies. An operation of the system 1 relates to a use of the spent steam supplies of at least the LPST 80.

Here, it is noted that the power plant shown in FIG. 1 is merely exemplary and that other configurations of the same are possible. For example, the HPST 60, the IPST 70 and the LPST 80 may be interchangeable or removed entirely as long as the system 1 is provided with a supply of diverted steam. Moreover, it is understood that the system 1 could be applied for use in other types of power plants and in other industrial applications besides those which are discussed herein. As a further example, the HPST 60, the IPST 70 and the LPST 80 may be coupled to the gas turbine 2 or may be run independently via a direct combustion of fuel, which generates heat from which steam may also be generated With reference to FIG. 2, the LPST 80 includes a high pressure stage 160 and a low pressure stage 170 and receives an inlet steam supply 180 from, e.g., one of the heat exchangers of the HRSG 3. The LPST 80 may also, in other arrangements, receive an inlet steam supply from any one or more of the HRSG 3, the HPST 60 or the IPST 70. In any case, the LPST 80 generates power and/or electricity during operations thereof and includes the high and low pressure stages 160 and 170 from which spent steam is outputted as, at least, first and second steam supplies 190 and 240, respectively. In an embodiment, the first and second steam supplies 190 and 240 may be outputted to have similar or dissimilar pressures of about 1.5 and 1 psia.

An air-cooled condenser 90 is configured to fluidly receive and to air-cool at least the first steam supply 190 and, in some cases, a portion of the second steam supply 240, as will be discussed below. The air-cooled condenser 90 is operated with, e.g., electrical power and cools the first steam supply 190 via a supply of air 200. The supply of air 200 is drawn from, e.g., ambient air that is initially external to the system 1, through an inlet 121 and is exhausted from the system 1 through an outlet 122 following the cooling of the first steam supply 190.

The system 1 further includes the cooling tower 110 from which a first water supply 210 is cycled and a chilling coil 220, which is disposed around the periphery of the air-cooled condenser 90. A second water supply 230 is cycled through the chilling coil 220 to thereby cool the supply of the air 200. A vapor-absorption machine (VAM) 120 is configured to fluidly receive the second steam supply 240 and the first water supply 210 by which a refrigeration cycle is conducted to thereby cool the second water supply 230 before the second water supply 230 is cycled through the chilling coil 220. The cycling of the first and second water supplies 210 and 230, respectively, may be accomplished by second and third pumps 260 and 250, respectively, or some other similar devices.

In an embodiment, the VAM 120 may include a first heat exchanger 126 by which the second steam supply 240 heats and thereby activates a refrigerant, a second heat exchanger 127 by which the first water supply 210 cools the activated refrigerant, a third heat exchanger 128 by which the first water supply 210 condenses the cooled refrigerant, and a fourth heat exchanger 129 by which the condensed refrigerant cools the second water supply 230. Here, the second and third heat exchangers 127 and 128 are fluidly arranged with respect to one another in series on the water side of the VAM 120. In an embodiment, the refrigerant may include a supply of Ammonia/water or Lithium Bromide/water combinations.

The system 10 may further include a condensate extraction pump (CEP) 100 to which the first and second steam supplies 190 and 240, having been condensed and/or outputted from the air-cooled condenser 90 and the VAM 120, respectively, are diverted.

As mentioned above, a portion of the second steam supply 240 may be diverted to the air-cooled condenser 90 by a valve 150 disposed between the first steam supply 190 and the second steam supply 240. The valve 150 allows for a control of a ratio of steam that is provided to the air-cooled condenser 90. The valve 150 can be controlled manually or automatically using a controller that may include, e.g., a micro-processor coupled to a distributed control system (DCS).

In accordance with yet another aspect, a method for use in a combined cycle or rankine cycle power plant 1, including a cooling tower 110 from which a first water supply 210 is cycled and, at least, a high pressure steam turbine (HPST) 60 and a low pressure steam turbine (LPST) 80, the LPST 80 being configured to output first and second steam supplies 190 and 240, is provided. The method includes cooling a supply of air 200 via a second water supply 230, operating an air-cooled condenser 90 via the supply of air 200 to thereby condense the first steam supply 190, and cooling the second water supply 230 via a refrigeration cycle in which the second steam supply 240 activates a refrigerant and the first water supply 210, which is cycled from the cooling tower 110, cools and condenses the refrigerant which subsequently exchanges heat with the second water supply 230.

The method may further include diverting the first and second steam supplies 190 and 240, as having been condensed, to a condensate extraction pump (CEP) 100, conducting a series of heat exchanges between the second steam supply 240 and the refrigerant and the first water supply 210 and the refrigerant, conducting a heat exchange between the refrigerant and the second water supply 230, and conducting a heat exchange between the second water supply 230 and the supply of air 200.

It has been found that a power plant including the system 1 may improve the efficiency of the power plant by 0.15% and, as such, the installation of the system 1 will recoup costs associated therewith. Moreover, it has also been seen that the installation of the system 1 will result in a 2.0 MW power gain for the combined cycle or rankine cycle power plant. The increased efficiency of the system 1 arises at least partly from the fact that steam in the LPST 80 may be expanded to about 2 pressures where half of the steam is expanded to the same pressure as it otherwise would be in a water cooled condenser driven system.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular exemplary embodiment disclosed as the best mode contemplated for carrying out this disclosure, but that the disclosure will include all embodiments falling within the scope of the appended claims.

We claim:

1. A system for use in a combined cycle or rankine cycle power plant, comprising:
   a steam turbine from which first and second steam supplies are outputted;
   an air-cooled condenser configured to fluidly receive and to air-cool at least the first steam supply via a supply of air;
   a cooling tower from which a first water supply is cycled;
   a chilling coil through which a second water supply water is cycled to thereby cool the supply of air; and
   a vapor-absorption-machine (VAM) configured to fluidly receive the second steam supply and the first water supply by which a refrigeration cycle is conducted to thereby cool the second water supply.

2. The system according to claim 1, wherein the first and second steam supplies have unequal pressures.

3. The system according to claim 1, further comprising a condensate extraction pump to which the first and second steam supplies, having been outputted from the air-cooled condenser and the VAM, respectively, are diverted.

4. The system according to claim 1, wherein the VAM comprises:
   a first heat exchanger by which the second steam supply heats and thereby activates a refrigerant;
   a second heat exchanger by which the first water supply cools the activated refrigerant;
   a third heat exchanger by which the first water supply condenses the cooled refrigerant; and
   a fourth heat exchanger by which the condensed refrigerant cools the second water supply.

5. The system according to claim 1, further comprising:
   a first pump configured to pump the first water supply through the VAM; and
   a second pump configured to pump the second water supply through the VAM and, subsequently, the chilling coil.

6. The system according to claim 1, wherein the chilling coil is disposed around the periphery of the air-cooled condenser or is an integral component thereof.

7. The system according to claim 6, further comprising:
an inlet disposed upstream from the chilling coil through which the supply of air is cycled; and
an outlet disposed downstream from the chilling coil through which the supply of air is outputted.

8. A system for use in a combined cycle or rankine cycle power plant, the power plant comprising:
a steam source which generates steam during operations thereof; and
at least high and low pressure steam turbines, each of which is configured to fluidly receive the generated steam, the low pressure steam turbine being further configured to output first and second steam supplies, and the system comprising:
an air-cooled condenser configured to fluidly receive and to air-cool at least the first steam supply via a supply of air;
a cooling tower from which a first water supply is cycled;
a chilling coil through which a second water supply water is cycled to thereby cool the supply of air; and
a vapor-absorption-machine (VAM) configured to fluidly receive the second steam supply and the first water supply by which a refrigeration cycle is conducted to thereby cool the second water supply.

9. The system according to claim 8, the first and second steam supplies have unequal pressures.

10. The system according to claim 8, further comprising a condensate extraction pump to which the first and second steam supplies, having been outputted from the air-cooled condenser and the VAM, respectively, are diverted.

11. The system according to claim 8, wherein the VAM comprises:
a first heat exchanger by which the second steam supply heats and thereby activates a refrigerant;
a second heat exchanger by which the first water supply cools the activated refrigerant;
a third heat exchanger by which the first water supply condenses the cooled refrigerant; and
a fourth heat exchanger by which the condensed refrigerant cools the second water supply.

12. The system according to claim 8, further comprising:
a first pump configured to pump the first water supply through the VAM; and
a second pump configured to pump the second water supply through the VAM and, subsequently, the chilling coil.

13. The system according to claim 8, wherein the chilling coil is disposed around the periphery of the air-cooled condenser or is an integral component thereof.

14. The system according to claim 13, further comprises:
an inlet disposed upstream from the chilling coil through which the supply of air is cycled; and
an outlet disposed downstream from the chilling coil through which the supply of air is outputted.

* * * * *